(12) United States Patent
Ligozat et al.

(10) Patent No.: US 10,896,303 B2
(45) Date of Patent: Jan. 19, 2021

(54) METHOD OF IMAGE ACQUISITION BY AN IMAGE SENSOR OF CMOS TYPE FOR THE RECOGNITION OF OPTICALLY READABLE CODE

(71) Applicant: Teledyne e2v Semiconductors SAS, Saint Egrève (FR)

(72) Inventors: Thierry Ligozat, Quaix en Chartreuse (FR); Bruno Diasparra, Seyssins (FR); Stéphane Gesset, Saint Laurent du Pont (FR); Gareth Powell, St Martin d'Uriage (FR)

(73) Assignee: TELEDYNE E2V SEMICONDUCTORS SAS, Saint Egreve (FR)

( * ) Notice: Subject to any disclaimer, the term of this patent is extended or adjusted under 35 U.S.C. 154(b) by 0 days.

(21) Appl. No.: 16/643,116

(22) PCT Filed: Aug. 24, 2018

(86) PCT No.: PCT/EP2018/072898
§ 371 (c)(1),
(2) Date: Feb. 28, 2020

(87) PCT Pub. No.: WO2019/042890
PCT Pub. Date: Mar. 7, 2019

(65) Prior Publication Data
US 2020/0394373 A1 Dec. 17, 2020

(30) Foreign Application Priority Data
Sep. 1, 2017 (FR) ..................................... 17 58086

(51) Int. Cl.
*G06K 7/10* (2006.01)

(52) U.S. Cl.
CPC ..... *G06K 7/10752* (2013.01); *G06K 7/10564* (2013.01); *G06K 7/10851* (2013.01)

(58) Field of Classification Search
CPC ...... G06T 2207/00; G06T 2207/10024; H04N 5/23212; H04N 5/2353; H04N 5/2258; G06K 7/10722
(Continued)

(56) References Cited

U.S. PATENT DOCUMENTS

| 5,756,981 A | * | 5/1998 | Roustaei | ............... G03F 7/705 |
| | | | | 235/462.07 |
| 2005/0092843 A1 | * | 5/2005 | Dowling | ............ G06K 7/10811 |
| | | | | 235/472.01 |

(Continued)

FOREIGN PATENT DOCUMENTS

| EP | 0957448 A2 | 11/1999 |
| EP | 1791074 A1 | 5/2007 |

(Continued)

OTHER PUBLICATIONS

International Search Report and Written Opinion for PCT/EP2018/072898, dated Oct. 22, 2018.

*Primary Examiner* — Daniel St Cyr
(74) *Attorney, Agent, or Firm* — Pilloff Passino & Cosenza LLP; Sean A. Passino; Rachel K. Pilloff (57) ABSTRACT

The invention provides a method for acquiring an image of a target code, which allows the CMOS sensor, after the reader has been triggered to acquire a target code, to rapidly determine, and internally, a desirable exposure-time value Topt for the image capture of this code. When it is triggered, the sensor activates a measuring mode Mode_MES with a rapid acquisition of image data for k different exposure-time values Ti, i=1 to k, k being at least equal to 2, and this acquisition is employed only by the sensor and to rapidly define a desirable exposure-time value on the basis of (Continued)

histograms H(Ti) calculated with the image data acquired with the various exposure times; this value is stored in the register of image-capture parameters, and the sensor then activates a nominal image-acquiring mode Mode_ACQ, which applies this desirable exposure-time value delivered by the registered to all the pixels of the matrix array, and the obtained image DATA-OUT is the image delivered as output by the sensor, for recognition/decoding of the code by an external system.

14 Claims, 6 Drawing Sheets

(58) Field of Classification Search
USPC ...... 235/454, 462.09, 462.1, 462.11, 462.45, 235/472.01
See application file for complete search history.

(56) References Cited

U.S. PATENT DOCUMENTS

| | | | |
|---|---|---|---|
| 2006/0208083 A1* | 9/2006 | Kotlarsky | G06K 7/10881 235/462.01 |
| 2006/0219792 A1* | 10/2006 | Zhu | G06K 7/10831 235/462.06 |
| 2016/0112620 A1* | 4/2016 | Mine | G03B 7/093 348/234 |
| 2018/0047165 A1* | 2/2018 | Sato | A61B 1/00032 |
| 2018/0350060 A1* | 12/2018 | Nakao | G06T 7/194 |

FOREIGN PATENT DOCUMENTS

| | | |
|---|---|---|
| WO | 9613799 A2 | 5/1996 |
| WO | 2006098955 A2 | 9/2006 |

* cited by examiner

|      | Col0 | Col1 | Col2 | Col3 | Col4 | Col5 | Col6 | Col7 | ... |
|------|------|------|------|------|------|------|------|------|-----|
| Row0 | T1   | T2   | T3   | T4   | T1   | T2   | T3   | T4   | ... |
| Row1 | T1   | T2   | T3   | T4   | T1   | T2   | T3   | T4   | ... |
| Row2 | T1   | T2   | T3   | T4   | T1   | T2   | T3   | T4   | ... |
| Row3 | T1   | T2   | T3   | T4   | T1   | T2   | T3   | T4   | ... |
| Row4 | T1   | T2   | T3   | T4   | T1   | T2   | T3   | T4   | ... |
| Row5 | T1   | T2   | T3   | T4   | T1   | T2   | T3   | T4   | ... |
| ...  | ...  | ...  | ...  | ...  | ...  | ...  | ...  | ...  | ... |

Fig. 8

|      | Col0 | Col1 | Col2 | Col3 | Col4 | Col5 | Col6 | Col7 | ... |
|------|------|------|------|------|------|------|------|------|-----|
| Row0 | T1   | T1   | T1   | T1   | T1   | T1   | T1   | T1   | ... |
| Row1 | T2   | T2   | T2   | T2   | T2   | T2   | T2   | T2   | ... |
| Row2 | T3   | T3   | T3   | T3   | T3   | T3   | T3   | T3   | ... |
| Row3 | T4   | T4   | T4   | T4   | T4   | T4   | T4   | T4   | ... |
| Row4 | T1   | T1   | T1   | T1   | T1   | T1   | T1   | T1   | ... |
| Row5 | T2   | T2   | T2   | T2   | T2   | T2   | T2   | T2   | ... |
| ...  | ...  | ...  | ...  | ...  | ...  | ...  | ...  | ...  | ... |

METHOD OF IMAGE ACQUISITION BY AN IMAGE SENSOR OF CMOS TYPE FOR THE RECOGNITION OF OPTICALLY READABLE CODE

TECHNICAL FIELD

The present invention relates to a method for controlling image capture by an active-pixel (pixel structure comprising a photosensitive element and control transistors) CMOS sensor for recognizing optically readable code. These sensors are integrated into code-recognizing electro-optical devices, which are generally called barcode readers. These readers are commonly employed in many commercial and industrial sectors, as means for automatically collecting data, replacing keyboard input, for applications as varied as sales, traceability (manufacture, distribution), the dispatch of merchandise, healthcare, stock management, the loan of books, etc.

These codes, which are generally printed (label) or engraved onto the surface of an object, generally employ a two-colour symbology that may be one-dimensional and linear (barcode) or multidimensional (QR code, PDF 417, Data Matrix, etc.). Each symbol or pattern bijectively represents an information value (or a set of values) that is associated with the object on which the code is placed, such as a price and/or a discount, traceability data (date, place of manufacture, of dispatch, where it was sampled, etc.), etc. Decoding the code allows the one or more information values associated with the object in question to be reliably obtained.

PRIOR ART

A code reader incorporating a CMOS matrix-array image sensor comprises an illuminating device including a light source (LEDs and/or a laser for example) associated with an optical assembly (mirrors, lenses), which light source is provided to illuminate the target code to be acquired. The sensor takes an image of this target code and transmits the obtained image data to an external digital processing system (which is connected to the reader by means of any type of wired or wireless communicating means) and it is this system external to the sensor that decodes the code.

What is required in this type of application is that the sensor delivers, as rapidly as possible, an image of the code that is of good quality, i.e. of high enough quality to allow the code to be decoded or recognized without error. More precisely, the image delivered by the sensor must be well positioned in the useful dynamic range of the sensor, i.e. neither be too underexposed, otherwise the signal-to-noise ratio will be too low; nor too overexposed, in order not to lose too much useful information.

Once the light power of the internal illuminating source of the reader has been adjusted for the application, the obtained image quality depends on the image-capture parameters of the sensor, and in particular on the exposure time of the pixels. The exposure time is generally preset in the factory or on site by an operator to a value that is defined depending on the operational conditions of use: ambient light level (use outside, inside, under artificial light); power of the light source of the reader, i.e. of the source that illuminates the object/code; type of material of the objects bearing the codes; fixed or manually held reader. However this preset "default" value does not in practice allow a good quality image to be obtained straightaway from the first image capture, because there are too many exterior factors related to the ergonomics of the reader, preventing the actual image-capture conditions from being completely controlled. The ergonomics of the reader defines how it will be used. For example, the reader may be fixed, and the target code brought manually or mechanically to in front of the reader; or indeed the reader may be portable, i.e. handled (by hand) or worn (on the arm, on the head, etc.) by an operator. The environment in which the reader operates may be lit with artificial or natural ambient lighting. The object itself (relatively reflective character of the surface comprising the code) or the way in which it is presented (distance, presentation angle) are all factors that may also have an influence on the amount of light that the sensor collects. Thus, when the sensor is triggered, it will apply image-capture parameters that will not necessarily be suitable for the conditions of image capture of the target code, at the moment the capture is triggered.

For these reasons, an iterative image-capture loop that is controlled by the external code-recognizing system is used with the aim of tailoring the image-capture parameters, and especially the exposure time of the pixels, to the actual conditions. This loop functions as follows: once triggered, the sensor periodically acquires images of the target code, which it transmits to the external system. For each image capture, it applies current values of the parameters delivered by the image-capture register of the sensor, thereby in particular defining the exposure-time value. For its part, the system receives the images, and for each received image, if it judges the quality thereof to be too low to allow the code to be decoded, i.e. if the image is not well enough exposed, the external system determines and transmits a new exposure-time value, which is stored in the register of image-capture parameters of the sensor, with the aim of obtaining a new image that should be better exposed. This value will be taken into account by the sensor only on the next image capture. This iterative acquisition and delivery loop continues until the system validates the quality of the image and decodes the code with success.

The determination of a new exposure-time value by the external system uses one or more algorithms that exploit the histogram of the image, i.e. the distribution of the pixels as a function of the greyscale levels of the image (or probability density, if the histogram is normalized). If there are 256 greyscale levels coded in the image, the histogram indicates how many pixels have the value 0, 1, up to 255.

The external system therefore calculates the histogram of the received image; on the basis of the current exposure-time value, and of the gain of the read chain of the pixels (but this gain is generally set to 1 for this type of application), which values are delivered by the sensor with the image data, the external system determines, where appropriate, a new exposure-time value by comparing one or more characteristic values of the obtained histogram (average value, percentage of pixels having a value below a given greyscale level, percentage of saturated pixels, etc.) to reference values. The new exposure-time value thus determined will be lower than the current value, if the image was overexposed, and, in contrast, higher if the image was underexposed.

Technical Problem

In practice, on account of the time taken to acquire the images and to deliver them to the external system, and the time taken to determine a new exposure-time value and to write it to the sensor, the new exposure-time value set by the external system on the basis of the data of a first image delivered by the sensor will at best be applied only to the third or even the fourth image capture that follows the first image capture; the system must still check the quality of this third or fourth image, and then, and only if this quality is good, decode the code.

This iterative external loop for determining an exposure time suitable for the acquisition of the current target code makes the response time of the code reader non-negligible, corresponding as it does to the time taken to receive at least three or four images. As a result, the response time of the reader, i.e. the time between the moment at which it is triggered and the moment at which the code is decoded, is too slow. This slowness, which is perceptible, degrades the user ergonomics of the reader and the power consumption of the system (power consumption of the sensor, and also of the illuminating source (number of flashes of the LEDs)) increases with the number of images that are captured.

Patent application EP 1 791 074 proposes to determine an optimal exposure time for the image capture of a barcode, by varying the exposure time from one matrix-array zone, covering a set of rows, to another, in the context of a rolling-shutter exposure mode. In a first image capture, which is called the research image capture, 5 different exposure times are applied to 5 image zones in a rolling-shutter mode, and statistical calculations are carried out for each image zone in order to discriminate between the zones and determine the best exposure time, or to extrapolate it from the two best exposure times. The exposure time thus determined is then used for a new image capture, which is the image delivered as output. The method has the drawback of requiring two complete image captures, and of comparing statistics that are calculated for different image zones.

SUMMARY OF THE INVENTION

The invention provides another technique for determining the optimal exposure time for the capture of an image of a target code by a code reader incorporating a CMOS sensor, which improves both response time and the quality of the image delivered as output.

The technical solution on which the present invention is based is a method for acquiring an image of a target code that allows the sensor, after the reader has been triggered to acquire the target code, to rapidly and internally (on-chip) determine a desirable exposure-time value for the image capture of this code by means of a measuring mode prior to the nominal image capture, which performs a rapid acquisition of image data with at least two different exposure-time values that are periodically distributed over the rows or over the columns of the matrix array, and the image data obtained with these various exposure-time values are employed only by the sensor and only to rapidly define the desirable exposure-time value. This value is then used to perform a nominal image capture, and the obtained image is the image delivered as output, for decoding/recognition of the code. The response time of a code reader using such a sensor is significantly decreased. It is mainly equal to the short time taken to acquire the image data used to determine the desirable time value, added to the time taken to acquire and to deliver as output a single nominal image. Moreover, the various exposure-time values being distributed periodically, over the rows or indeed the columns, the nominal exposure time is determined on the basis of statistics calculated with data issued from pixels that are regularly distributed over the entirety of the image. In other words, these measurement-image data have a good spatial uniformity (under-sampling) and a good temporal uniformity (Ti), which favour an optimal determination of the desirable exposure time.

This dual, spatial and temporal, uniformity is favoured by combining, in the phase of rapid read-out of the measurement image, a choice of distribution of the various exposure times and row-dependent undersampling.

The method of the invention therefore allows the ergonomics of the code reader to be perceptibly improved and its power consumption to be decreased.

The invention therefore relates to a method for acquiring an image of one or more codes that are optically readable by a CMOS electronic image sensor, which is activated on reception, by the sensor, of an external triggering signal and which comprises carrying out a measurement image capture in order to determine a desirable exposure-time value, said desirable exposure-time value then being applied as current exposure-time value to all the pixels of the matrix array, in order to carry out a nominal image capture, characterized in that the measurement image capture comprises:

an integrating phase, which is common to the pixels, and in which k different exposure-time values are applied to pixels that are regularly distributed over the rows or columns of the matrix array, each pixel being associated with one among the k different values, k being an integer at least equal to 2;

a rapid-acquiring phase, in which digital image data are rapidly acquired with the various pixel-exposure-time values, and which comprises a rapid read-out phase applying under-sampling of the rows of the matrix array; and a determining phase, in which the desirable exposure-time value is determined by comparing histograms calculated on the basis of the digital image data obtained in the rapid-acquiring phase for each different exposure-time value.

According to one aspect of the invention, the k pixel-exposure time values are distributed on the pixels according to a periodic pattern on the columns of the matrix.

According to one aspect of the invention, under-sampling of the rows of the matrix array, is in a ratio of 1 to 8, 16 or 32.

According to another aspect of the invention, the histograms for the various exposure-time values of the measuring mode are calculated with a number of greyscale levels lower than the number of greyscale levels corresponding to the resolution of the analogue-digital converting means in the measuring mode.

Other features and advantages of the invention are presented in the following description, with reference to the appended drawings, in which.

DETAILED DESCRIPTION

Figure 1:
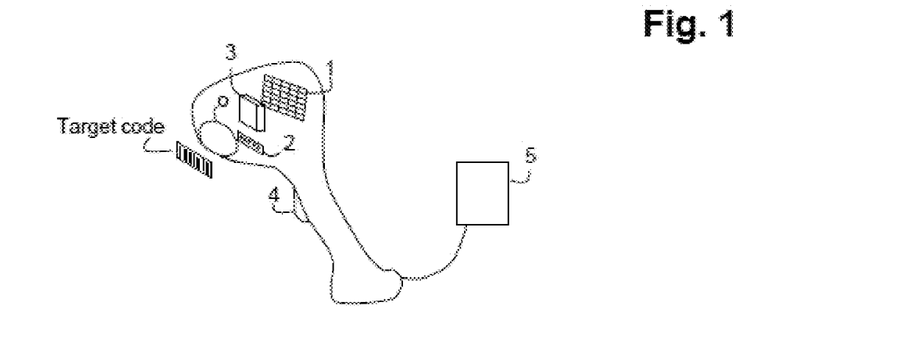
FIG. 1 schematically illustrates a portable code reader.

The invention relates to code readers incorporating a CMOS sensor, irrespectively of whether they are fixed, such as those integrated into supermarket self-checkouts, or portable and actuated by an operator. A code reader, portable in this example, is illustrated in FIG. 1. It comprises a CMOS electronic sensor 1, comprising a matrix array of active pixels; a light source 2 for illuminating the target (the code placed on an object) through a window that is referenced o; and an optical system 3 that is provided to redirect the light reflected by the target onto the pixel matrix array of the sensor. In present-day systems, for the image capture, the light source generally employs a flash of light generated by LEDs to illuminate the target. Certain systems may furthermore integrate, with the aim of helping the operator to centre the target code prior to the image capture, a laser source associated with a diffractive optic to project a particular pattern (cross, corners, etc.). This operation is known as an aiming operation. This laser source is normally turned off before the flash of the LEDs for the image capture.

The portable reader is equipped with a trigger 4 or an equivalent mechanism, which is optionally manual, for triggering the reader. When this mechanism is activated, a triggering signal Trig wakes the reader from a low-power standby mode, the light source and sensor are activated in order to acquire an image of the target code and to deliver it to an external system 5 for processing digital data, which decodes the code. The image is delivered to the processing system 5 in the form of a stream of (digital) data via a transmission cable, for example a USB cable, or via a wireless transmission means. If the reader is fixed, the triggering signal Trig is for example generated by a presence-detecting system integrated into the reader.

Figure 2:
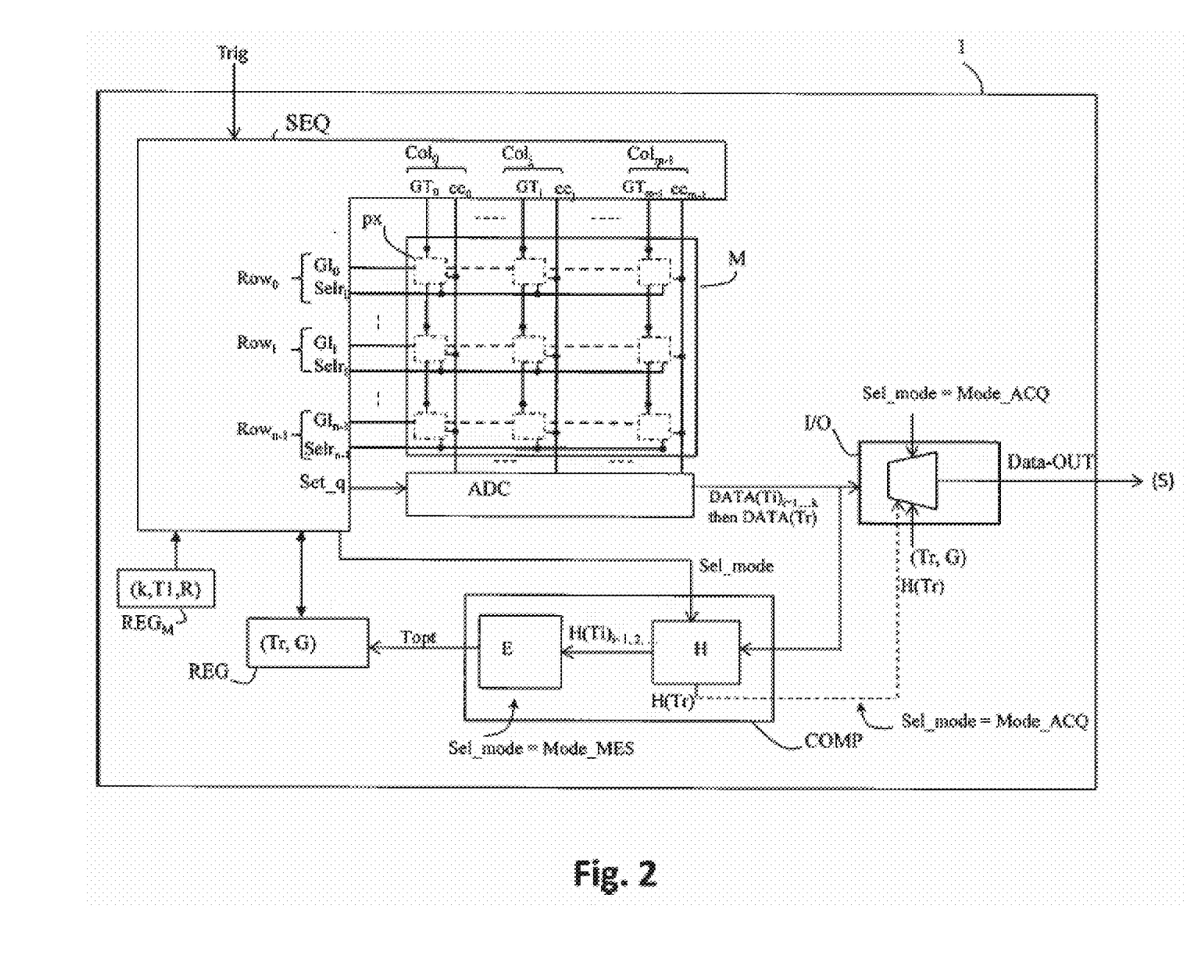
FIG. 2 is a simplified schematic of a CMOS-sensor architecture of a prior-art code reader, suitable for implementing a method according to the invention.

The CMOS sensor conventionally comprises, as shown in FIG. 2, a matrix array M of n rows $Row_0$ to $Row_{n-1}$ and m columns $Col_0$ to $Col_{m-1}$ of active pixels (n, m integers), a read-out circuit ADC comprising one or more analogue-digital converters, a digital processing circuit COMP that is able to perform calculations on the image data delivered by the read-out circuit and in particular to calculate a histogram, and an I/O interface circuit for delivering the image data to the external system 5. These various circuits are controlled by a circuit SEQ for sequencing the sensor, which delivers the various control signals required to carry out an image capture. In particular, the sequencing circuit delivers the signals for controlling the transistors of the active pixels.

For the sake of the description, it will be recalled here that a transistor-comprising active-pixel structure of the CMOS sensors generally comprises at least:

an initialization transistor, which allows all the charge accumulated in the photosensitive element to be evacuated to an evacuation drain. The end of the initialization pulse sets the start point of the exposure time of the pixel: from this point, the photosensitive element may (once more) accumulate photogenerated charge;

a transfer transistor that allows all the charge accumulated by the photosensitive element to be transferred to a storage node, which may be the read-out node of the pixel or a temporary storage node. The end of the transfer pulse sets the end of the exposure time of the pixel, for the image capture that is in progress;

a transistor for zeroing the read-out node of the pixel; and a follower transistor the gate of which is connected to the read-out node, which is associated with a transistor for selecting the pixel, which is connected between the source of the follower transistor and a column conductor, which allow the charge stored in the read-out node to be converted to a corresponding analogue voltage level on the column conductor, which is connected to an analogue-digital conversion circuit.

Although there is no need, for the sake of the description of the invention, to go further into the details, it is well known that an active-pixel structure may comprise transistors other than the above four transistors, depending on whether provision is made for a temporary storage node, separate from the read-out node, or an amplifying stage, etc. Also, certain transistors may be shared between a plurality of pixels.

In the invention, the exposure time of the active pixels is more specifically electronically controlled, via the initialization and transfer transistors (gates), to implement, in and with the sensor, a measuring mode allowing a desirable exposure-time value Topt for the acquisition of an image of a target code to be determined prior to a nominal image capture of the target code, which image capture is carried out in the conventional way but with the value Topt.

The measuring mode therefore uses the fact that it is possible to adjust the exposure time of an active pixel to apply various exposure-time values to the pixels. This may be achieved by adjusting the (gate) command of the initialization transistor, which sets the start of the exposure time, and/or by adjusting the (gate) command of the transfer transistor, which controls the transfer to the associated storage node (which may or may not be the read-out node), thereby adjusting its end, while taking into account the capture mode(s) implemented in the sensor and the topology of the control lines. It will be recalled that a CMOS sensor may be able to implement one or two capture modes, a global-shutter mode or a rolling-shutter mode. In the global-shutter or "snapshot" image-capture mode, all the pixels integrate at the same time: the exposure phase starts at the same time for all the pixels and it also ends at the same time for all the pixels. The read-out phase, which is carried out row by row, then starts. This global-shutter capture mode is preferred for high-performance (e.g. high-speed) applications because it allows the image to be frozen and avoids the distortions inherent to the rolling-shutter mode, which may degrade the image quality, in particular if the object moves. In the rolling-shutter capture mode, the rows integrate in succession in an offset manner: the start of the exposure phase is defined for each row of pixels and offset from one row to the next and the exposure time in one row of pixels starts only when the read-out of the preceding row of pixels has ended. The global-shutter capture mode is preferred for high-performance (e.g. high-speed) applications because it allows the image to be frozen and avoids the distortions inherent to the rolling-shutter capture mode, which may degrade the image quality, in particular if the object moves.

The topology of the control lines meets various constraints such as: number of transistors, pixels with shared transistors or not, global-shutter and/or rolling-shutter capture mode, optimization of the aperture ratio of the pixels. For example, the topology of the control lines shown in FIG. 2 allows the end of the exposure time to be controlled columnwise, and is suitable for a global-shutter capture mode; whereas the topology shown in FIG. 3 allows the start and the end of the exposure time to be controlled rowwise and allows both types of capture. These topologies will be detailed below.

In any case, the sequencing circuit SEQ allows the signals for controlling the pixels and other circuits of the sensor (converters, output interface, etc.) to be generated with a pixel timing tailored to the one or more capture modes and topology implemented. For more details on how a sequencing circuit may achieve this control with great flexibility by memory programming, the reader may for example refer to patent application EP3058719.

Having made these general observations, it is now possible to describe the method for acquiring an image of a target code that is provided by the invention. This method, which is triggered by the activation of the signal Trig, allows a single image of nominal quality, and that may be directly used by the processing system 5 to decode/recognize the code, to be delivered because said single image is obtained while applying, to the pixel matrix array, an exposure-time value, for the integration of the light, that is determined, internally by the sensor itself (on-chip), in a measuring mode activated before the nominal acquiring mode, on the basis of histograms calculated from at least one measurement image of degraded quality and with at least two different exposure-time values.

By "degraded quality" what is meant is that the number of pixels of the measurement image is lower than the number of pixels of the image of nominal quality: in other words, the pixel matrix array is under-sampled; and/or the resolution of the measurement (read-out) of the amount of light integrated by a pixel is lower in the measuring mode than in the nominal acquiring mode: in other words, the analogue-digital conversion of the light levels read out from the pixels delivers a result that is coded into fewer greyscale levels in the measuring mode than in the nominal acquiring mode. For example, if in the conversion for the nominal image is carried out on 10 or 12 bits, for the measurement image, the conversion is carried out preferably on 8 bits, or even on 4 bits.

Figure 4:
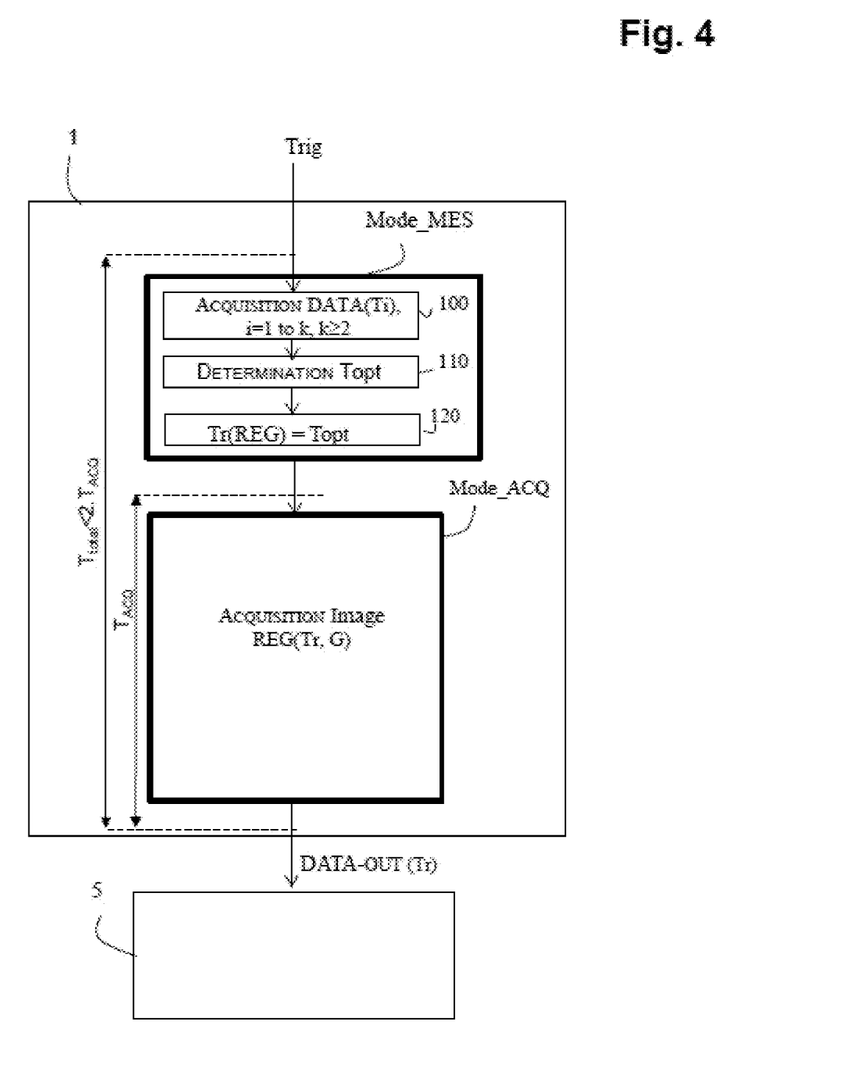
FIG. 4 is a general flowchart of a method for acquiring an image in a barcode-reader sensor according to the invention.

FIG. 4 shows a general flowchart of a method for acquiring a target code according to a first implementation of the invention, with a measuring mode Mode_MES, triggered by the signal Trig, that makes provision for a single measurement image capture in which each pixel is associated with one exposure-time value among k different exposure-time values T1 to Tk, k being an integer at least equal to two. The measuring mode mainly comprises three phases that are controlled by the sequencing circuit of the sensor: a rapid-acquiring phase 100, in which image data DATA(Ti) are rapidly acquired with each of the k exposure-time values; then a determining phase 110, in which the digital processing circuit COMP of the sensor determines, on the basis of the image data DATA(Ti), and depending on image-quality criteria that are known to allow efficient decoding of the code, a desirable exposure-time value Topt for the image capture of the target code in question: neither too high, in order not to have too many saturated pixels, nor too low, in order not to lose signal (black pixels); and a storing phase 120, in which the value Topt is stored in the corresponding field Tr of the register REG of image-capture parameters of the sensor.

The method then activates the nominal acquiring mode Mode_ACQ, which uses the current values of the parameters in the register REG, and in particular the parameter Tr. This register may contain other parameters such as a conversion-gain value G, but in code-reading applications in which it is not sought to reconstruct an image with precision, but rather to decode a code, this gain is generally set to 1. An optimal image quality (for the decoding of the code) is obtained: the corresponding image data Data-OUT, obtained with the exposure-time value Tr, are read out from the pixels of the matrix array (complete image) and transmitted to the external processing system 5. Generally, the values of the parameters in the register REG (Tr, G) are also delivered with these data, to which may also be added the histogram data H(Tr) calculated by the digital processing circuit from these data Data-OUT. This nominal acquiring phase, which is carried out by the sensor, thus corresponds to the conventional mode in which a complete image is acquired and delivered, except that the exposure-time value Tr applied, which is delivered by the register of image-capture parameters of the sensor, is a value that is self-determined by the sensor itself in the preceding measuring phase Mode_MES.

Figure 5:
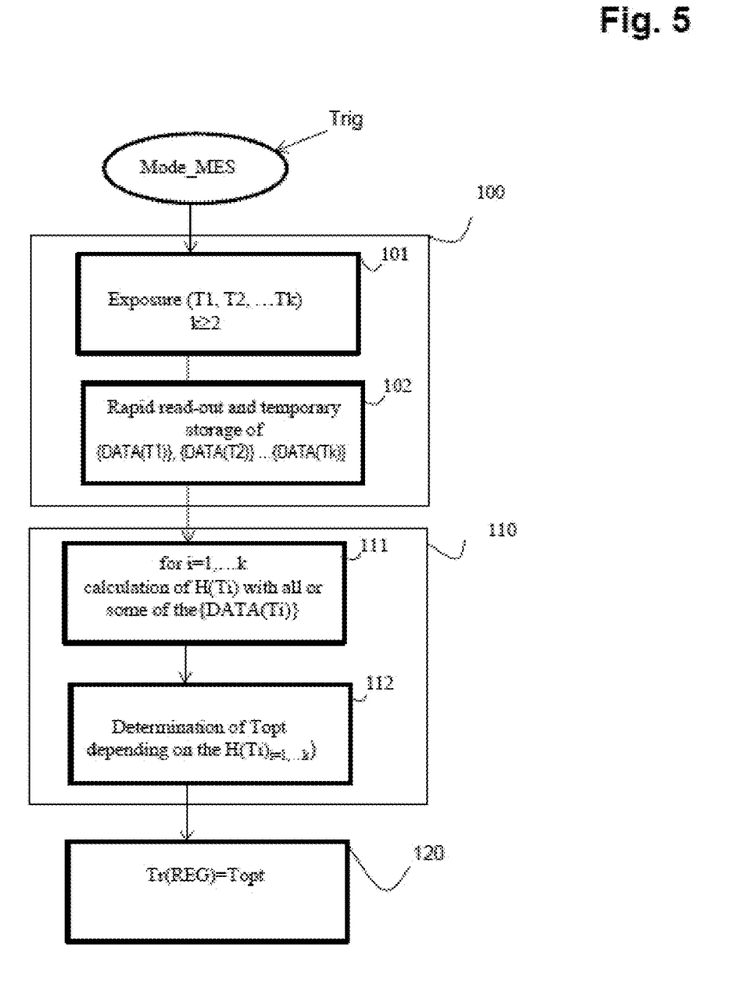
FIG. 5 is a more detailed flowchart of the rapid measuring step of the acquiring method according to the invention.

The rapid-acquiring phase 100 of the measuring mode is illustrated in more detail in FIG. 5. It is a question of rapidly acquiring image data for k exposure-time values Ti, in order to calculate the value Topt, in a time $T_{MES}$ shorter than the time $T_{ACQ}$ taken to deliver a nominal image, so that the total duration $T_{total}$ of the acquiring method according to the invention allowing a nominal image to be delivered for decoding to the external system 5 is less than $2 \times T_{ACQ}$. Preferably, it is aimed to achieve a $T_{MES} \leq 10\% \ T_{ACQ}$.

According to one preferred implementation, the acquisition of the image data with the k values Ti is performed in a single capture, by periodically distributing the k values Ti over the pixel matrix array. The rapid-acquiring phase 100 thus comprises an exposing phase 101 in which the pixels are exposed, each pixel of the matrix array being associated with a given exposure-time value among the k values Ti; followed by a rapid read-out phase 102 in which the pixels are rapidly read out.

The pattern of distribution of the Ti takes into account the way in which the control lines of the initialization and transfer transistors (gates) of the pixels in the sensor are implemented (topological aspect) and the capture mode or modes implemented in the sensor.

It has already been explained how the sequences of exposure and read-out of the rows of pixels of the matrix array will be controlled (differently) depending on the chosen image-capture control mode (global shutter or rolling shutter).

Let us examine the topological aspect in more detail. In general, to limit the number of conductors and to allow pixel aperture size to be increased, the commands of the transfer and initialization gates are common to the pixels of a given row or a given column.

In the example illustrated in FIG. 2, the command of the initialization gates, which adjust the start of the exposure time, is common to the pixels of a given row of the matrix array; and the command of the transfer gates, which adjust the end of the exposure time, is common to the pixels of a given column of the matrix array.

More precisely, the matrix array comprises n rows of pixels $Row_0$ to $Row_{n-1}$ and m columns of pixels $Col_0$ to $Col_{m-1}$ (n, m integers) and there are:

n gate-initialization control lines $GI_l$, for l equal to 0 to n−1, each extending parallel (in the example horizontally) to the corresponding row of pixels;

m transfer-gate control lines $GT_j$, for j equal to 0 to m−1, each extending parallel (in the example vertically) to the corresponding column of pixels; and n row-selection control lines $selr_l$, for l equal to 0 to n−1, each extending parallel (in the example horizontally) to the corresponding row of pixels, for controlling the gate of the transistor for selecting pixels of the row.

The control lines of the other transistors of the pixels are not shown in FIG. 2 in order not to needlessly clutter the drawing.

This topology, which makes provision to control the end of the exposure of the pixels columnwise and to read out rowwise (per row of pixels) enables a global-shutter capture mode. It is not applicable to a rolling-shutter capture mode, in which the phase of exposing a row of pixels starts only when the read-out of the preceding row of pixels has ended.

Figure 3:
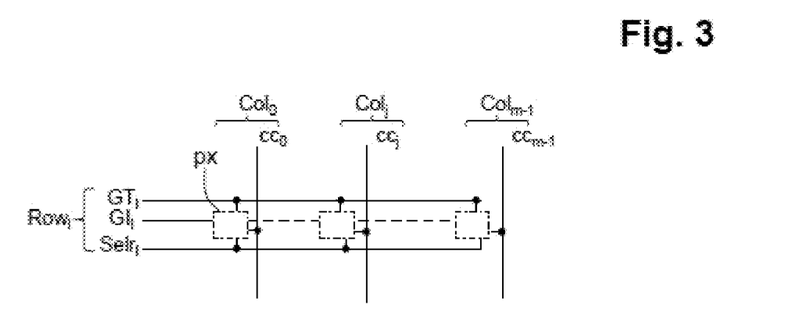
FIG. 3 illustrates a variant 5 scheme of control of the pixels of the matrix array of FIG. 2.

FIG. 3 illustrates another topology that allows both capture modes: the command of the initialization gates and the command of the transfer gates are both common to the pixels of a given row of the matrix array. The transfer control lines $GT_l$, l equal to 0 to n−1, therefore extend parallel (in the example horizontally) to the corresponding row of pixels, just like the initialization control lines $GI_l$.

Other sensor topologies may apply other control schemes. For example, the command of the initialization gates, which set the start of the exposure time, could be common to the pixels of a given column of the matrix array; the selection of the pixels for read-out could be made columnwise, etc. Depending on the topology, one or both control modes (global shutter, rolling shutter) are applicable.

Examples will now be used to illustrate how the topological aspects and the capture mode are taken into account to define the patterns of distribution of the values Ti over the matrix array, so as to allow the acquisition of image data with the k exposure-time values Ti in a single capture. It will generally be simpler and more advantageous to distribute the k values Ti in a single direction of the matrix array, and to use only a single, initialization or transfer, control line to achieve this distribution. Furthermore, with the aim of achieving, over the entirety of the matrix array, for the various values Ti, uniform information, the distribution of the values Ti is advantageously periodic.

Figure 7:
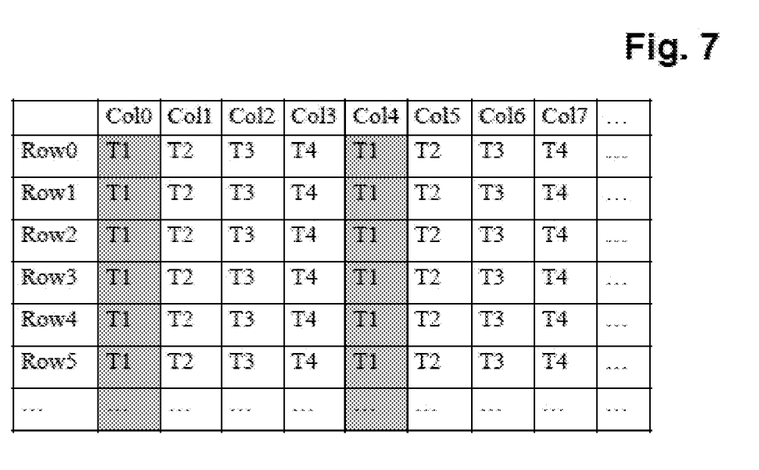
FIG. 7 illustrates an example of a distribution of various exposure-time values over the columns of the pixel matrix array.

FIG. 7 illustrates a first example of a pattern of distribution of the values Ti, i=1 to k, for k=4, over the pixel matrix array for the topology of FIG. 2 and for a global-shutter capture mode. In this pattern, the values Ti are regularly (periodically) distributed over the ranks of the columns. In the example: T1 is applied to columns of rank 0, 4, 8, etc.; T2 is applied to columns of rank 1, 5, 9, etc.; T3 is applied to columns of rank 2, 6, 10, etc. and T4 is applied to columns of rank 3, 7, 11, etc. An acquiring phase, in which image data are acquired with the k exposure values Ti, is then carried out as follows: the exposing phase starts for all the rows of pixels at the same time (signals $GI_l$ activated at the same time) and the sequencer controls the signals $GT_j$ that control the end of the exposure depending on the rank j of the column, according to the defined pattern (FIG. 7). The rowwise read-out phase may start after the end of the phase of exposing the matrix array, said read-out phase being synchronized with the longest exposure time, in the present case T4.

Figure 8:
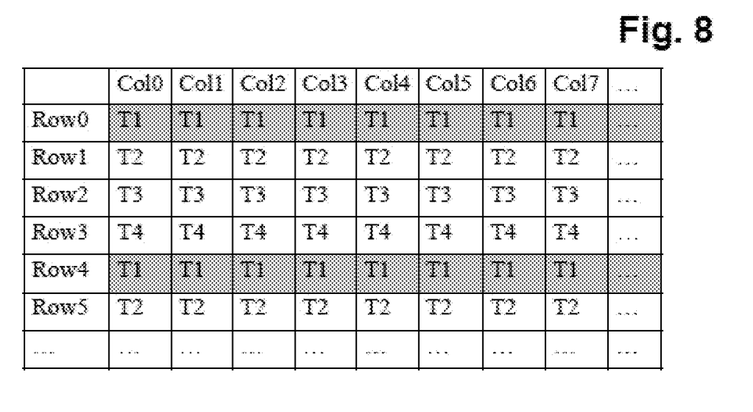
FIG. 8 illustrates another example of a distribution of various exposure-time values over the rows of the pixel matrix array.

FIG. 8 shows another distribution pattern applicable to a pixel matrix array having the topology of FIG. 3, which allows the sequencer to use the start of the exposure time (control lines $GI_l$) to adjust the exposure time of each row, and the rest of the timing (end of exposure, read-out), which depends on the (global-shutter or rolling-shutter) capture mode, is not affected by this "adjustment". More explicitly, the rows controlled to have a longer exposure time will have their initialization-gate command activated relatively earlier than the rows controlled to have a shorter exposure time, which will have their initialization-gate command activated relatively later on. In the example of FIG. 8, the value T1 is applied to the rows of rank 0, 4, 8, etc.; the value T2, to the rows of rank 1, 5, 9, etc.

Thus, depending on the topology of the control lines of the sensor in question, which may be the topology in FIG. 2, in FIG. 3, or another topology, it is possible to define a, preferably periodic, pattern of distribution of the various exposure times over the rows or the columns of the matrix array, and the sequencing circuit SEQ of the sensor (FIG. 2) is configured (programmed) to deliver the pixel-control signals corresponding to this pattern and to the capture mode of the sensor, in order to control the various phases of the measuring mode.

Regarding the number k of exposure-time values Ti, it may be advantageous to use only two different values T1 and T2 (k=2), because it is known how to easily implement this in the sequencer, depending on the parity of the row or column address: even (T1) or uneven (T2). In this case two values T1 and T2 that are quite far apart, corresponding to a high brightness and to a low brightness respectively, are chosen, 100 microseconds and 1 millisecond for example.

However, k will be chosen to be at least equal to 3 or 4 to cover a wide range of lighting conditions (dim to bright) and to improve the reliability and effectiveness of the determination of the value Topt under variable operational conditions, for example: outside, with objects to be analysed that are very reflective (e.g. metal drink can) or very absorbent (black paper). The k values Ti will then advantageously be chosen with a constant ratio R between one value and the next, in order to facilitate the calculations and have the same constraints on the histograms. To give a numerical example, the following will for example be chosen k=4 and T1=8 µs, T2=40 µs, T3=200 µs, T4=1 ms with a constant ratio of 5 therebetween (T2=5.T1, T3=5.T2, T4=5.T3).

In practice the values Ti are chosen depending on constraints on and capacities of the sequencer. For example, a reference time conventionally used in sequencers, for the management of signals, is the duration of a read-out cycle of a row (called the line time) in the nominal mode (full resolution), which is about 10 microseconds in present-day technologies. However, recent sequencers allow reference times lower than 1 to 2 microseconds to be achieved. Provision may be made, in the sensor, for a programmable register $REG_M$ (FIG. 2) of parameters of the measurement mode of the invention, in order to store the k values, the shortest exposure time (T1) and the ratio R.

After the exposing phase 102 (in which, in the rolling-shutter capture mode, each row is exposed and in which, in the global-shutter capture mode, all the rows are exposed), it is necessary to read-out the pixels, in order to obtain corresponding image data, with each of the various exposure-time values. This is the rapid read-out phase 102 of the measuring mode (FIG. 4). This rapid read-out phase meets the constraint related to the solution of the stated technical problem, namely that of self-determination by the sensor itself of the desirable exposure-time value Topt rapidly, in a time shorter than the acquisition time $T_{ACQ}$ of a complete image, in nominal mode. It is aimed in practice to carry out this determination of Topt, i.e. to acquire the measurement image (exposure with the Ti and read-out, calculations and storage of Topt) in a time of about 10% (or less) of the time $T_{ACQ}$, and it is indeed the read-out of the image data, and more precisely the time taken to convert the data and the amount of data to be acquired and transmitted to the digital processing circuit COMP which is critical.

The rapid read-out phase 102 uses either one of the two measures described below.

The first measure is to not read out all the pixels of the matrix array. It has been checked that histograms calculated with the data of the complete matrix array are not required to effectively determine the value Topt, but, in contrast, the image data must represent the various applied values Ti and allow a good analysis of the exposure. It is therefore proposed to under-sample the matrix array; however, the selection of the pixels to be read out must allow the various exposure-time values to be covered. In other words, the selection of the sampled pixels takes into account both the way in which the pixels are selected during read-out, i.e. the topology of the sensor, and the pattern of distribution of the Ti over the matrix array.

In general, and this corresponds to FIGS. 2 and 3, the read-out is carried out rowwise (row selection lines $selr_j$), and simultaneously for the m pixels of the selected row, via the m column conductors ($cc_0, \ldots cc_{m-1}$) connected to the analogue-digital converting means ADC, which deliver the m corresponding digital values.

Figure 9:
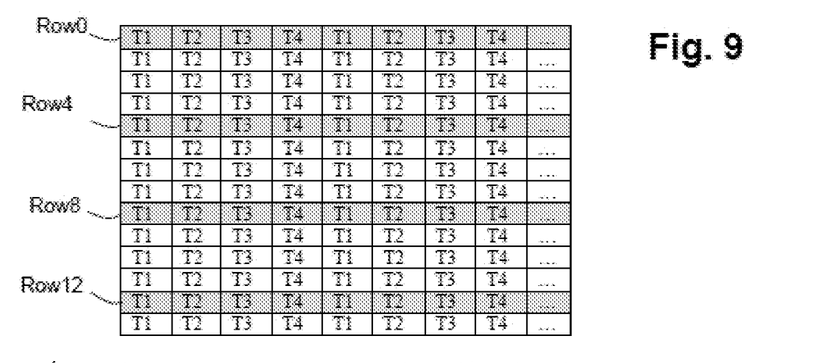
FIGS. 9 to 11 illustrate examples of definition of zones of interest in the matrix array for the measuring mode.

If the scheme of FIG. 7 is returned to, in which the various values Ti, i=1 to k are distributed depending on the rank of the columns, it is thus possible to choose to sample only one row in N. FIG. 9 shows this for N=4, for obvious reasons of simplicity of illustration, but N will preferably be equal to 8, 16 or 32. In each row, data will be generated corresponding to each of the k applied exposure-time values Ti. Furthermore, the set of sampled rows uniformly covers the extent of the image. In the end, as it is known how the values Ti are distributed, i.e., in the example, in which columns (these are configuration data of the sequencing circuit of the sensor), for each row sampled it is possible to associate, for each pixel, the read-out datum with an exposure value Ti. In other words, it is possible to form, for each value Ti, the dataset {DATA(Ti)} that will allow the corresponding histogram H(Ti) to be calculated for all or some of the greyscale levels coded by the decreased-resolution mode, as explained above. It will be noted that the example of vertical periodic distribution of the values Ti (depending on the rank of the columns) in FIG. 7, combined with horizontal under-sampling (1 row in N), which is therefore also periodic, in practice allows measurement-image data with a good spatial uniformity (under-sampling) and also a good temporal uniformity (Ti) to be obtained, for the analysis of the image exposure and the determination of Topt.

Figure 10:
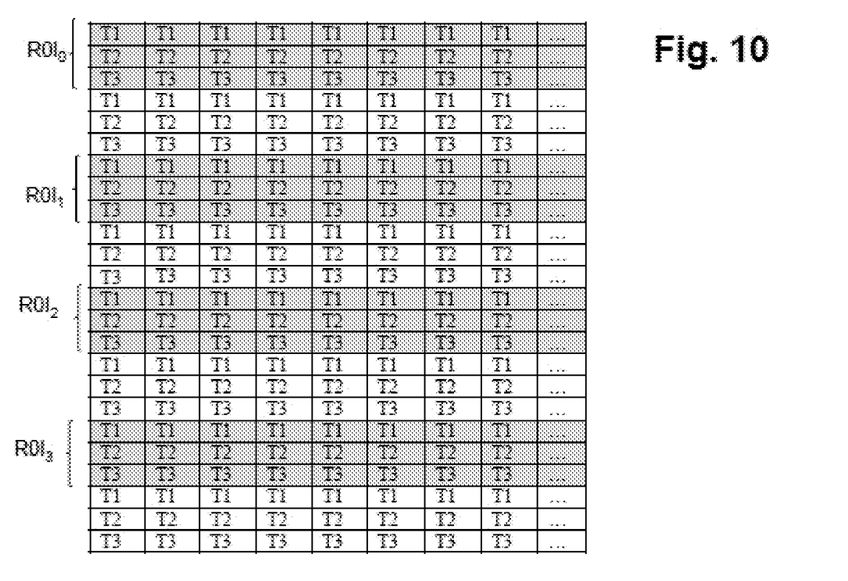

For the pattern of distribution of the values Ti in FIG. 8, which is dependent on the rank of the rows, it is necessary to apply a different definition of the rowwise under-sampling, because each row can deliver only data that correspond to a single exposure-time value. Generally, as illustrated in FIG. 8, the k values Ti will be distributed in a periodic pattern, to achieve a good temporal uniformity over the matrix array. It is then possible to make provision to sample k consecutive rows every X rows, while preferably still sampling, on the scale of the matrix array, one row in 8, 16 or 32. FIG. 10 illustrates this for k=3. This amounts to defining, for the rapid read-out 102, sets of consecutive rows $ROI_0, ROI_1 \ldots$ etc.

Because of the rowwise sequential read out, the read-out time of the measurement mode is proportional to the total number of rows read out.

Figure 11:
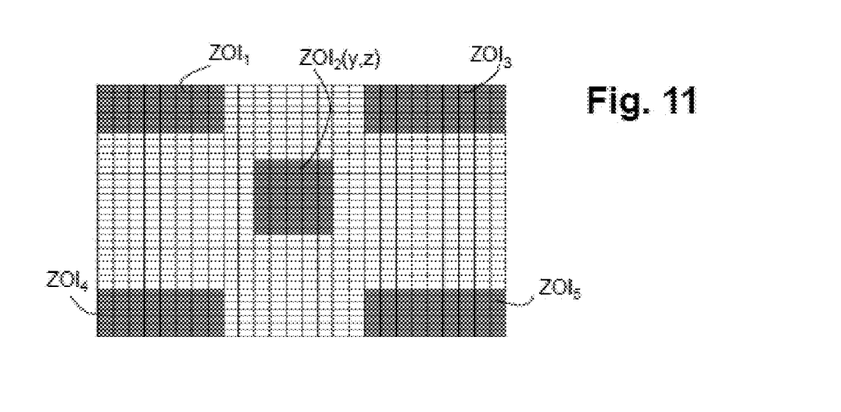

To further optimize the length of the measuring phase, it is possible to decrease the measurement-image read-out time by targeting one or more zones of interest in the matrix array, such as for example a central zone $ZOI_2$ or the corner zones $ZOI_1$ $ZOI_3$, $ZOI_4$ and $ZOI_5$ illustrated in FIG. 11.

These zones are defined depending on the application and cover a contiguous set of pixels that are sufficient in number to obtain a uniform spatial and temporal dataset allowing the exposure to be analysed and the value Topt to be effectively determined. In this case, the rapid read-out phase of the measuring mode applies horizontal under-sampling to the one or more target zones. For example, if one (1) zone of interest is defined for the measuring mode, which zone covers y rows and z columns of the matrix array, the read-out circuit is configured, in measuring mode, to sample 1 row in P over the height of the y rows, with P being an integer higher than or equal to 1; and for each sampled row, the read-out circuit will carry out m conversions in parallel, and only the image data delivered by the pixels of the z columns will be kept in order to be treated by the digital processing circuit, which establishes the desirable exposure-time value.

It will be noted that it is also possible to define (in negative) one or more particular zones of the matrix array that it is desired not to sample, because it is known that they may potentially be over-illuminated because of an aimer (because the aiming laser source will remain turned on). This amounts to defining rows (addresses) that will not be selected in the rapid read-out phase. Thus, the analysis of the exposure of the measuring image will not be disrupted by these potentially over-illuminated zones. In practice, these zones that are potentially over-illuminated by the aimer may be on the sides, and in particular at the corners (FIG. 11) or indeed at the centre (depending on the aimer).

To give a practical example combining the two approaches, for an aimer targeting the sides of the matrix array the corner zones will preferably be excluded in order to keep only a central zone of the matrix array defined for the analysis of the exposure of the image of the target code. To give a corresponding numerical example, for a sensor of 1000×1000 pixels (1 Mpixel sensor), it is possible to define such a central zone of interest $ZOI_2$ that covers 250 central rows and 250 central columns. The read-out time is decreased by a factor of 4 (250 rows to be read out from the 1000 of the complete matrix array). By associating therewith under-sampling of one row in 8, the read-out time is decreased by a factor of 32 (¼×⅛=1/32), with about 30 rows to be read from the 1000 of the matrix array. If on the contrary the aimer targets the centre, a central zone will preferably be excluded and in measuring mode corner zones will preferably be acquired.

A second measure is proposed for the rapid read-out phase 102, namely to decrease the resolution of the analogue-digital conversion. For example, by decreasing the resolution by two bits, the conversion time is decreased by a factor of 4. This measure is easily implemented, by means of a Set-q indicator positioned by the sequencer (FIG. 2) in order to set the resolution of the converter. In the invention, provision is made for this indicator to require in measuring mode, with respect to the nominal acquiring mode, a different, decreased, resolution.

The rapid read-out phase 102 according to the invention will preferably implement the under-sampling measure and the decreased-resolution measure. To give a numerical example, for a 10 bit sensor of 2K×1K (rows X columns) at 100 images/second (10 ms per nominal image), implementing a measuring mode to determine Topt according to the invention, and which combines under-sampling of one row in M=16, at a resolution decreased to 8 bits (therefore 2 bits less than the nominal mode), the improvement is a factor of 16×4=64. The acquisition time of the (degraded) measuring image decreases to 10 ms/64=156 μs (better than the objective of 10% of $T_{ACQ}$).

Once the rapid read-out phase 102 has ended, the measuring mode passes to the determining phase 110, in which the desirable exposure value Topt for the target code in question is determined. This phase 110 is carried out by the digital processing circuit COMP (FIG. 2), which is configured beforehand in measuring mode by the sequencer via a mode-indicating signal (Sel-mode).

The circuit COMP starts with the histogram-calculating phase 111. To calculate these histograms the circuit obtains, for each exposure-time value, a set {DATA(Ti)} of digital values read from the matrix array. Each value corresponds to a greyscale level in the greyscale-level range coded by the conversion. The histogram calculation carried out with these data (or some of these data corresponding to a selection of greyscale levels) gives the distribution of the pixels as a function of greyscale level for this exposure-time value Ti: the luminosity range of the image of the target code is therefore measured for this exposure time.

For these calculations, it is possible to process solely data corresponding to greyscale levels that are selected from among the greyscale levels corresponding to the resolution of the converter in measuring mode. For example, if the measuring mode applies a decreased resolution, for example 8 bits of resolution coding 256 greyscale levels, it is possible to calculate the histograms for only 8 or 16 greyscale levels (or bins) from the 256. It is thus possible to decrease the memory space (RAM memory, registers) required for these histogram calculations. It will be noted that in this case, such an 8- or 16-bin histogram calculation will advantageously be combined with at least 3 or 4 different exposure-time values, with therebetween a constant (integer) ratio R that will be comprised between 5 and 10 (inclusive). Thus all the advantages in terms of ambient-light-level coverage, memory space and determination effectiveness are combined.

Next, the determining phase 112, in which the time Topt is determined on the basis of the histograms calculated for the various times Ti, is passed to.

Figure 6:
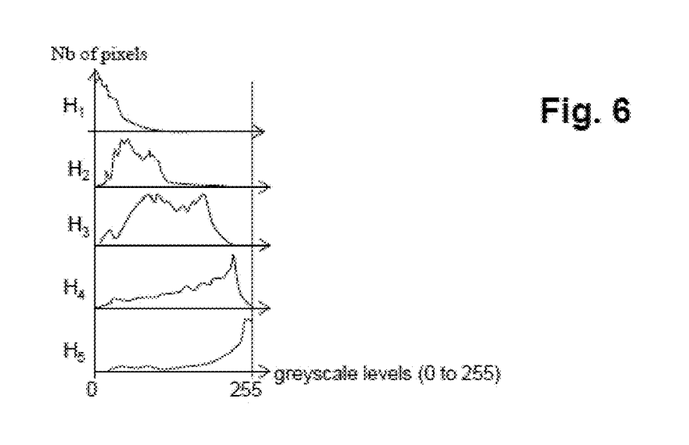
FIG. 6 shows various image histograms, corresponding to various times of exposure of the pixels to light.

FIG. 6 shows various histograms $H_1$ to $H_5$ calculated for 256 greyscale levels (256 classes or bins) corresponding to various conditions of exposure of an image. The first histogram $H_1$ at the top of the figure corresponds to an image that is not exposed enough, with a high percentage of black pixels and a concentration of pixels at the lowest greyscale levels. The last histogram $H_5$ at the bottom of the figure corresponds, in contrast, to an image that is too overexposed, with many saturated pixels and a concentration of pixels at the highest greyscale levels.

For a human eye, the histogram to be achieved is the middle histogram $H_3$, which is quite centred, without or with very few saturated (overexposed) pixels and without or with very few (underexposed) black pixels. However, to decode code with a data-processing system of a code reader, the histogram $H_4$, which shows a few saturated pixels, is entirely suitable.

Thus, on the basis of the histograms H(Ti) calculated in the phase 111, in the phase 112, an exposure-time value Topt is determined that must then allow, in the phase in which a nominal image is acquired, a histogram that resembles these histograms $H_3$ or $H_4$ to be obtained.

Let us assume that the histogram $H_5$ corresponds to an exposure time T5, Topt will have a value lower than T5, in order to tend toward a histogram shape such as $H_3$ or $H_4$. If the histogram $H_1$ corresponds to an exposure time T1, Topt will have a value higher than T1.

In practice, the calculating circuit starts by determining, in the phase 112, which histogram contains the most useful information (number of pixels that are neither saturated nor underexposed). To do this it applies an algorithm for comparing one or more characteristic values or statistics of the k histograms H(Ti), such as a mean value, percentage of pixels that are saturated or that correspond to a given greyscale level, etc.; then it estimates a desirable time value Topt on the basis of the retained histogram. Preferably, to improve the reliability of the determination, the calculating circuit combines the result of at least two comparing algorithms, preferably one based on the mean value and another based on a percentage of saturated pixels, to establish, by way of desirable exposure-time value for the following nominal acquiring phase, the average of the results delivered by the algorithms. The determination of the value Topt also takes into account the capacities (reference time, line time) of the sequencer.

Optionally, provision could be made for the optimal exposure-time value defined by the measuring mode to be obtained using a gain value G different from 1. In this case, the calculating circuit modifies the two corresponding values, exposure time Tr and gain G, in the register REG of image-capture parameters. The final histogram obtained from the final image will then be modified with a total gain=G×(Topt/Trf), where Trf is the integration time associated with the histogram retained in the measuring mode for the calculation of Topt.

These calculations carried out by the digital processing circuit COMP are very rapid: in a few clock cycles, i.e. in practice in less than one microsecond, the value Topt is delivered and stored in the register of image-capture parameters of the sensor in order to define the exposure-time value Tr of the pixels in nominal acquiring mode. The measuring mode ends and the nominal acquiring mode is subsequently activated: the sensor carries out a new image capture, in nominal acquiring mode, using the current values of the register of image-capture parameters, including the value Tr=Topt, and delivers the obtained image to the external processing system for decoding/recognition of the code.

The invention which has just been described, and which is applicable to any CMOS sensor used in a reader of optically readable code, allows the response time and power consumption of the reader to be considerably improved and its power consumption to be decreased. Those skilled in the art will be able to make the modifications required depending on the sensor in question, and in particular depending on the capture modes implemented in the sensor, on the topology of the control lines of the pixel matrix array, and on the structure of the pixels, which may be relatively complex depending on whether or not said structure implements state-of-the-art read-out schemes, schemes for decreasing read-out noise (correlated double sampling), charge-multiplying amplifying stages, etc. Those skilled in the art will be able to apply the rapid-acquiring and determining phases of the measuring mode that have been described, and to define a pattern of distribution of the various exposure-time values where appropriate, and/or a scheme of definition of rows and/or columns of the matrix array to be sampled.

The implementation of the method of the invention in a sensor requires the sequencer to be suitably configured/programmed, this involving programming into memory tables defining the schemes of distribution and of undersampling, and the various exposure-time values used in the measuring mode.

The invention claimed is:

1. Method for acquiring an image of one or more codes that are optically readable by a CMOS electronic image sensor, which is activated on reception, by the sensor, of an external triggering signal (Trig) and which comprises carrying out a measurement image capture in order to determine a desirable exposure-time value, said desirable exposure-time value then being applied as current exposure-time value to all the pixels of the matrix array, in order to carry out a nominal image capture, characterized in that the measurement image capture (Mode-Mes) comprises:

- an integrating phase (100), which is common to the pixels, and in which k different exposure-time values (Ti) are applied to pixels that are regularly distributed over the rows or columns of the matrix array, each pixel being associated with one among the k different exposure-time values, k integer at least equal to 2;
- a rapid-acquiring phase (102), in which digital image data (DATA(Ti)) are rapidly acquired with the various pixel-exposure-time values, and which comprises a rapid read-out phase applying under-sampling of the rows of the matrix array; and
- a determining phase (110), in which the desirable exposure-time value (Topt) is determined by comparing histograms calculated on the basis of the digital image data obtained in the rapid-acquiring phase for each different exposure-time value.

2. Acquiring method according to claim 1, applying a periodic distribution pattern of the k exposure-time values (Ti) to the columns of the matrix array.

3. Acquiring method according to claim 2, wherein the rapid read-out phase applies under-sampling of the rows, which is in a ratio of 1 to 8, 16 or 32.

4. Acquiring method according to claim 3, wherein the rapid read-out phase (102) is only applied to one or more predefined zones of the matrix array.

5. Acquiring method according to claim 2, excluding, for the rapid read-out phase (102), one or more predefined zones of the pixel matrix array.

6. Acquiring method according to claim 1, wherein the rapid read-out phase applies under-sampling of the rows, which is in a ratio of 1 to 8, 16 or 32.

7. Acquiring method according to claim 6, wherein the rapid read-out phase (102) is only applied to one or more predefined zones of the matrix array.

8. Acquiring method according to claim 6, excluding, for the rapid read-out phase (102), one or more predefined zones of the pixel matrix array.

9. Acquiring method according to claim 1, wherein the rapid read-out phase (102) is only applied to one or more predefined zones of the matrix array.

10. Acquiring method according to claim 1, excluding, for the rapid read-out phase (102), one or more predefined zones of the pixel matrix array.

11. Method according to claim 1, using analogue-digital converting means for reading the pixels that are configured with a nominal resolution of at least ten bits for the nominal image capture, and configured with a decreased resolution equal to or lower than eight bits for the measurement image capture.

12. Acquiring method according to claim 1, wherein the histograms for the k various exposure-time values (T1, ... Tk) of the measuring mode are calculated with a number of greyscale levels lower than the number of greyscale levels corresponding to the resolution of the analogue-digital converting means in the measuring mode.

13. Acquiring method according to claim 1, wherein the determining phase (112), in which the desirable exposure-time value (Topt) is determined, applies at least two histogram-comparing algorithms, each algorithm delivering as output a first value, and establishes, as desirable exposure-time value for the following nominal acquiring phase, the average of said first values.

14. Acquiring method according to claim 1, in which the time for the measurement image capture is about 10% or less that of the nominal image capture.

* * * * *